(No Model.) 3 Sheets—Sheet 1.
W. D. WATKINS.
HAY RAKE AND STACKER.
No. 400,530. Patented Apr. 2, 1889.
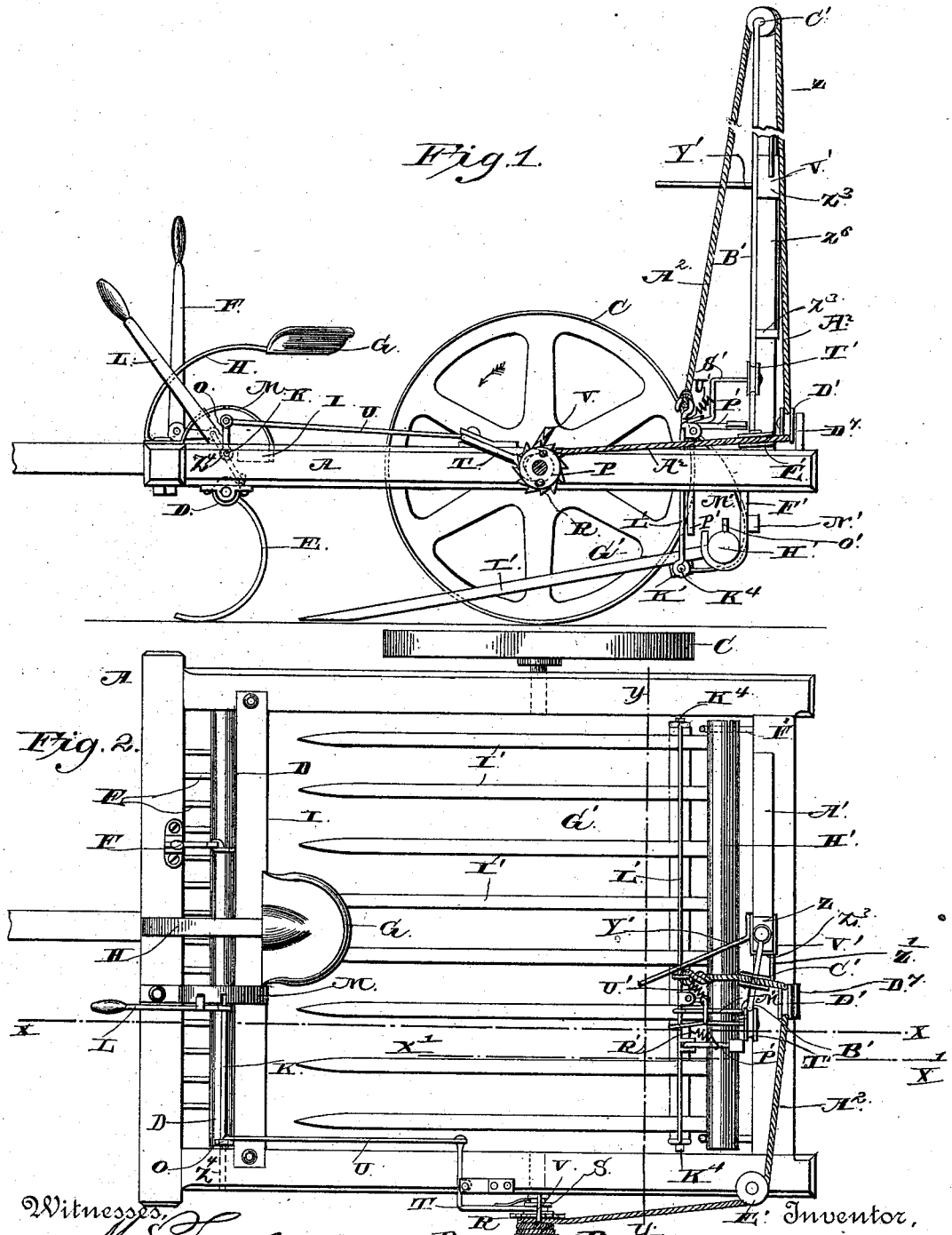

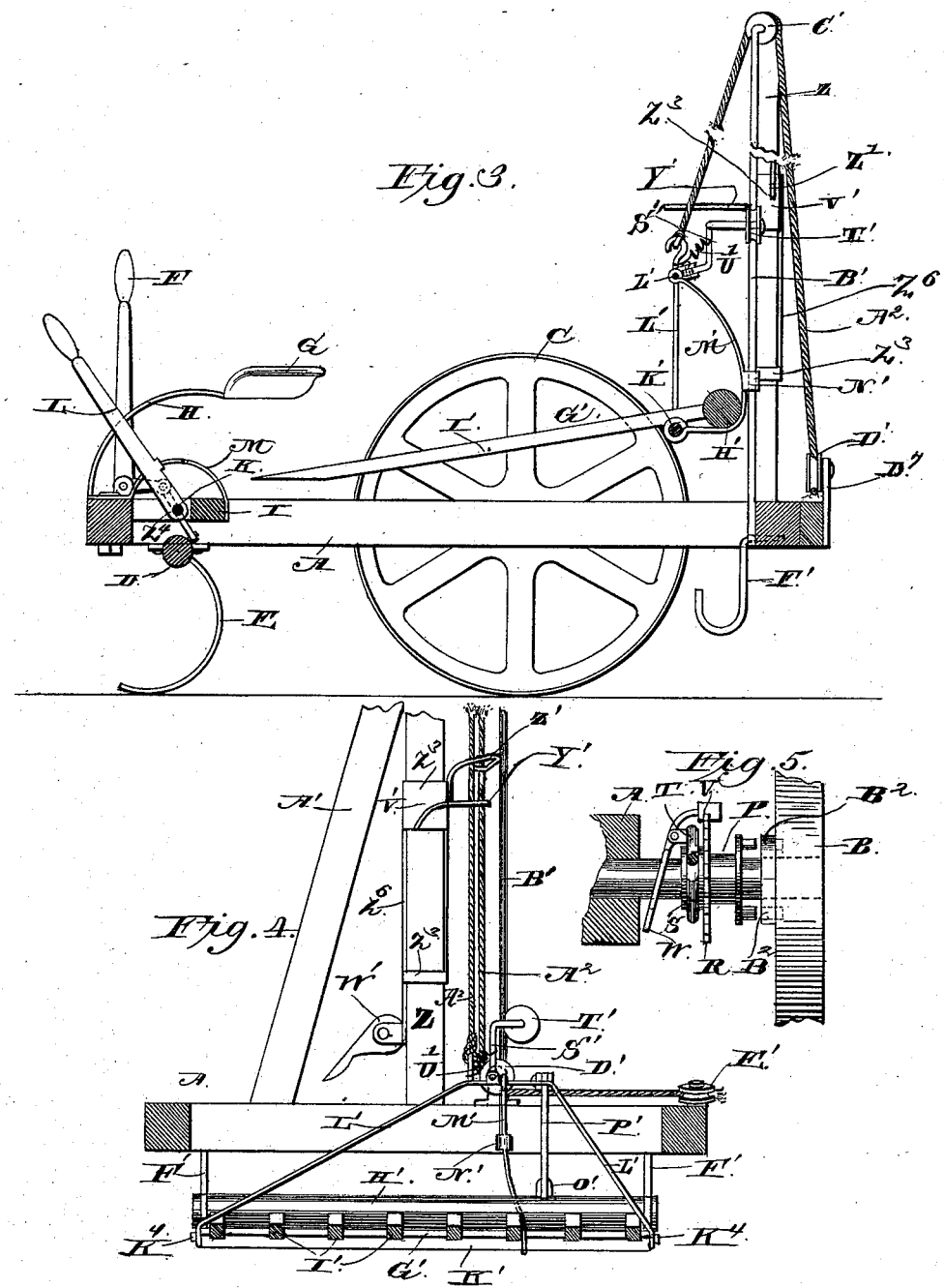

(No Model.) 3 Sheets—Sheet 3.
W. D. WATKINS.
HAY RAKE AND STACKER.
No. 400,530. Patented Apr. 2, 1889.
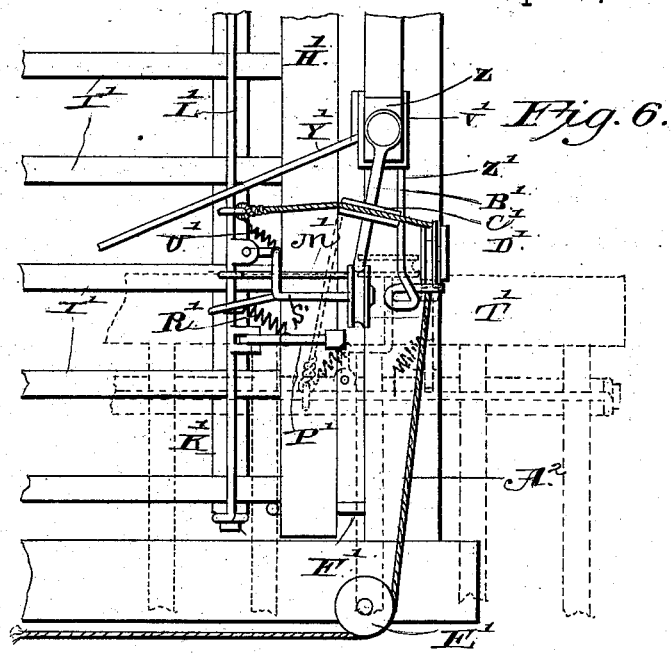
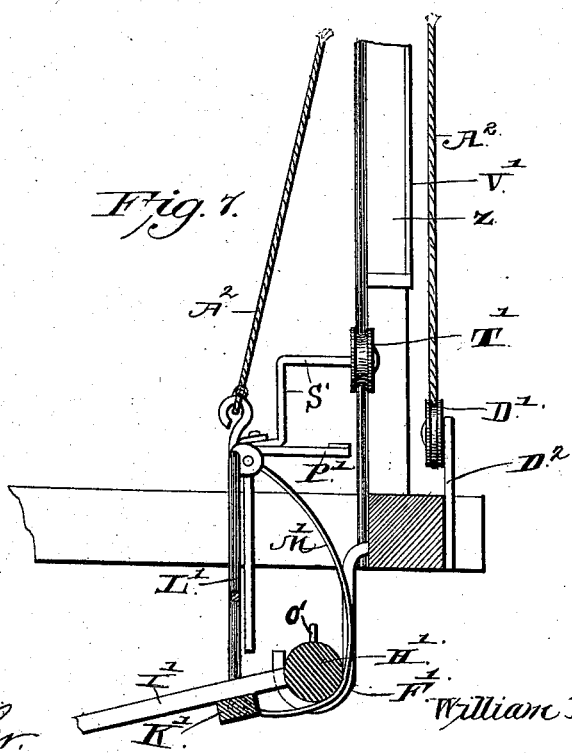

UNITED STATES PATENT OFFICE.

WILLIAM D. WATKINS, OF EL DORADO SPRINGS, ASSIGNOR OF ONE-HALF TO JOHN H. LUCUS, OF OSCEOLA, MISSOURI.

HAY RAKE AND STACKER.

SPECIFICATION forming part of Letters Patent No. 400,530, dated April 2, 1889.

Application filed July 25, 1888. Serial No. 281,027. (No model.)

*To all whom it may concern:*

Be it known that I, WILLIAM D. WATKINS, a citizen of the United States, residing at El Dorado Springs, in the county of Cedar and State of Missouri, have invented a new and useful Improvement in Hay Rakes and Stackers, of which the following is a specification.

My invention relates to an improvement in hay rakes and stackers; and it consists in the peculiar construction and combination of devices, that will be more fully set forth hereinafter, and particularly pointed out in the claims.

In the accompanying drawings, Figure 1 is a side elevation of a hay rake and stacker embodying my improvement. Fig. 2 is a top plan view of the same, the fork being elevated. Fig. 3 is a vertical longitudinal sectional view taken on the line $x\ x$ of Fig. 2. Fig. 4 is a vertical transverse sectional view taken on the line $y\ y$ of Fig. 2, looking to the rear. Fig. 5 is a detail view showing the clutch. Fig. 6 is a detail plan view. Fig. 7 is a detail sectional view taken on the line $x'\ x'$ of Fig. 2.

A represents a horizontal rectangular frame, which is supported by a pair of wheels, B C, said wheels being journaled on spindles that project outward from the side beams of the frame at a suitable distance from the rear end thereof. Journaled in suitable bearings under the front end of the frame is a rake-head, D, having the usual curved rake-teeth, E. This rake-head is adapted to be operated by an elbow-lever, F, as shown, and in the usual manner, so that the said rake may be discharged of its contents from time to time. A seat, G, for the driver is supported on a spring-arm, H, which projects upward and rearward from the front end of the frame.

I represents a transverse bar, which connects the side beams of the frame, and is arranged parallel with and in rear of the front cross-beam of the frame. Journaled in suitable bearings, $Z^4$, and arranged between the front beam of the frame and the cross-bar I, is a rock-shaft, K, having a lever, L, at its inner end, adapted to be secured at any desired inclination by a notched sector-plate, M, secured to bar I and to front bar of the frame, and near the outer end of said rock-shaft K is an upright arm, O.

On one of the spindles for the wheels is loosely journaled a drum, P, which is provided on its inner side with peripheral ratchet-teeth R. The said drum has an inwardly-extending hub or collar, S, provided with a grooved perimeter and engaged by one arm of a bell-crank lever, T, which lever is fulcrumed to one of the side beams of the frame, and is connected by its other arm to the arm O of rock-shaft K by means of a link-rod, U. V represents a gravity-pawl, which is pivoted transversely to the arm of the lever T, which engages the collar S and engages the ratchet-teeth of the drum, the said pawl having a downwardly-extending arm, W, which is adapted to strike against the opposing side beam of the frame when the drum is moved inward, so as to disengage the pawl from the ratchet-teeth on the drum, and thereby permit the latter to rotate in a retrograde direction, for the purpose to be hereinafter explained.

The drum is provided on its outer side with clutch-studs, which are adapted to engage corresponding recesses, $B^2$, on the inner side of the wheel B, so as to lock the drum to the said wheel when the drum is moved outward, and thereby cause the said wheel to rotate the said drum in the direction indicated by the arrow in Fig. 1 when the machine is drawn forward.

From the rear end beam of the frame, at the center thereof, projects a vertical standard, Z, which is supported and braced in position by an inclined rod or bar, A'.

B' represents a vertical rod, which extends from the rear end beam of the frame, and is arranged parallel with the standard Z and at a suitable distance therefrom, and has its upper end bent at right angles to a horizontal position and secured to the upper end of said standard. The said horizontal portion of the rod B' forms a bearing for a pulley, C'.

D' represents a guiding-sheave, which is journaled in a suitable support, $D^7$, at the base of rod B', and E' represents a similar guiding-sheave, which is journaled at that rear corner of the frame next to and in rear of the drum before described. Depending from the rear beam of the frame near the ends thereof are supporting curved hooks F'.

G' represents a stacker-fork, which comprises the rear head, H', the straight tines I', projecting forward therefrom, and the bar K', arranged transversely beneath the tines and connected thereto at a suitable distance in front of the head H'. The ends of the said cross-bar K' form projecting spindles K⁴, to which are attached the arms of a supporting-bail, L'. From the said suspending bail, at a suitable distance from the center thereof, depends a rod, M', which passes behind and under the head H' of the stacking-fork, and has its lower front end connected pivotally to the cross-bar K', the function of the said rod being to limit the downward movement of the head of the stacking-fork, and said rod is further provided on its rear with loops N', which engage the rod B' and are adapted to guide the stacking-fork vertically on the said rod. On the upper side of the head H' of the stacking-fork, and alongside the rod M', is a lug or ear, O'.

P' represents a right-angled trip-lever, which is pivoted at its angle to the supporting-bail, and has its lower end adapted to engage the head H' of the stacking-fork in front of the ear or lug O', and has attached at its upper end a coiled spring, R', which is also attached to the bail L', and tends to disengage the lower end of the said trip-lever from the lug O' on the said head H' and allow the rake to tilt.

S' represents a guide-arm, which is pivoted at its inner or front end to the supporting-bail of the stacking-fork, and has an anti-friction roller, T', journaled to its outer or rear end. The said guiding-arm is further connected to the supporting-bail at a point at a suitable distance from the pivot of said arm by means of a coiled retractile spring, U', the function of which is to keep the anti-friction roller normally in engagement with one side of the standard Z and to normally keep the tines of the stacking-fork in line with the frame of the machine.

V' represents a vertically-movable slide, which is arranged on the standard Z, and comprises a pair of loops or bands, Z³, which embrace the said standard, and are connected together by a strap or rod, Z⁶. A cam-lever, W', is pivoted to the lower loop or band of the said slide, and is adapted to impinge against the standard, so as to secure the slide thereto at any desired vertical adjustment. From the upper portion of the slide, on the front side thereof, extends a laterally-projecting upwardly-inclined arm, Y', and also from the upper end of the slide on the side projects an inclined arm, Z'.

A² represents a cord, which is attached to near the middle of the supporting-bail of the stacking-fork, passes over the pulley C', is guided by the sheaves D' and E', and has its front end attached to the drum P.

The operation of my invention is as follows: The machine is in its normal or initial position when the stacking-fork is lowered, and is arranged directly behind the rake-head D, and the drum is moved inward out of engagement with the wheel B. When the stacking-fork is thus lowered, its head H' has its ends arranged in the hooks F' and the points of the tines rest on the ground. When the machine is drawn forward across a hay-field, the hay is gathered by the rake until the same becomes filled, and the operator then dumps the said rake by means of the lever F, so as to cause the rake to drop its load of hay, and as the machine continues to advance the said hay is gathered upon the stacking-fork G'. The operator then puts the lever P' in engagement with the lug O' and operates the lever L, so as to throw the drum into engagement with the wheel B, thereby causing the said drum to rotate and wind up the rope A², and consequently elevate the stacking-fork with its load of hay. The stacking-fork is maintained in a horizontal position by the lower end of the trip-lever P' engaging the lug O', and when the fork has been raised a sufficient height its yoke or supporting-bail impinges against the inclined arm or cam Y', and the latter causes the stacking-fork to swing around over one side of the frame, and when the said fork has swung a sufficient distance to cause the points of the tines to clear the frame the spring-actuated trip becomes engaged by the arm Z', the latter serving to disengage the trip-arm from the fork, and consequently the preponderating weight of the hay on the tines of the stacking-fork cause the same to tilt and discharge the hay over one side of the frame. By this means the hay after being raked from the ground may be conveyed to any desired part of the field and formed into a stack, as will be readily understood, the slide V' on the standard Z being adjusted to any desired height, according to the desired height of the stack.

Having thus described my invention, I claim—

1. The combination, in a hay rake and stacker, of the frame having the vertical standard, vertical guide-rod, the stacking-fork having the suspending bail guided on the guide-rod, the trip-lever pivoted to the bail and engaging the head of the fork, the arm pivoted to the bail and carrying a pulley engaging the guide-rod, the spring connecting said arm, and the bail to keep its pulley in contact with the guide-rod, an arm projecting from the standard to engage the bail, and an arm to strike the trip-lever, and thereby swing the stacking-fork to one side and discharge the same, and means, substantially as set forth, to raise and lower the stacking-fork, substantially as described.

2. The combination, in a hay rake and stacker, of the frame having the vertical standard, the slide movable on said standard and having the eccentric cam-lever, and the trip-arm Z', the vertical guide-rod, the stacker-fork having the supporting-bail guided on the guide-rod, an arm projecting from the standard to engage the bail, and the trip-lever pivoted to the bail and adapted to engage the stacking-fork, and means, substantially as set forth, to raise and lower the stacking-fork, substantially as described.

3. The combination, in a hay rake and stacker, of the main frame having the depending curved hooks at its rear end and the rake at its front end, the stacking-fork having the head adapted to be supported in the hooks when said stacking-fork is lowered, and the elevating devices to raise and lower the stacking-fork, substantially as described.

In testimony that I claim the foregoing as my own I have hereto affixed my signature in presence of two witnesses.

WILLIAM D. WATKINS.

Witnesses:
 WM. H. ANTHONY,
 A. W. HUTCHISON.